(12) United States Patent
Scott (10) Patent No.: US 9,649,898 B2
(45) Date of Patent: May 16, 2017

(54) AIR CHUCK WITH VARIABLE ANGLE SWIVEL HEAD

(71) Applicant: Steven Richard Scott, Curlew, WA (US)

(72) Inventor: Steven Richard Scott, Curlew, WA (US)

(73) Assignee: Motion Pro, Inc., Loomis, CA (US)

( * ) Notice: Subject to any disclaimer, the term of this patent is extended or adjusted under 35 U.S.C. 154(b) by 0 days.

(21) Appl. No.: 14/723,082

(22) Filed: May 27, 2015

(65) Prior Publication Data
US 2016/0347136 A1    Dec. 1, 2016

(51) Int. Cl.
*F16K 15/20*    (2006.01)
*B60C 29/06*    (2006.01)
*B60S 5/04*    (2006.01)

(52) U.S. Cl.
CPC ............... *B60C 29/06* (2013.01); *B60S 5/04* (2013.01); *F16K 15/20* (2013.01); *Y10T 137/3584* (2015.04); *Y10T 137/3724* (2015.04)

(58) Field of Classification Search
CPC ......... Y10T 137/3584; Y10T 137/3724; Y10T 137/5196; F16K 3/243; F16K 1/04; F16K 15/20; F16K 15/207; F16K 3/262; F16K 3/267; F16K 51/00; F16L 37/28; F16L 15/04; F16L 17/00; F16L 15/08; F16L 29/007; F04B 33/05; F04B 33/00; B60C 29/06; B60S 5/054; B60S 5/04; F16F 9/43
USPC .................................. 137/223, 231
See application file for complete search history.

(56) References Cited

U.S. PATENT DOCUMENTS

| | | | | |
|---|---|---|---|---|
| 118,722 A | * | 9/1871 | Hull ..................... | F16L 27/0861 137/615 |
| 712,738 A | * | 11/1902 | Stevens ................. | F16L 27/093 285/190 |
| 1,430,098 A | * | 9/1922 | Mills .................... | B60C 23/0496 137/224 |
| 1,668,753 A | * | 5/1928 | Baker .................... | G01L 17/00 137/225 |
| 1,806,983 A | * | 5/1931 | Norgren ................. | F16L 37/42 137/223 |
| 2,271,269 A | * | 1/1942 | Longstreet ............. | B60C 29/00 137/231 |
| 2,307,328 A | * | 1/1943 | Martin .................. | F16L 27/093 285/190 |
| 2,481,404 A | * | 9/1949 | Donner ................. | F16L 27/093 152/427 |

(Continued)

OTHER PUBLICATIONS

"Motion Pro Pivot Air Chuck Video Review", Adventure Designs,Oct. 27, 2015, [retreived Jan. 3, 2017]. Retrieved from the internet: <URL: http://www.bing.com/videos/search?q=motion+ pro+air+chuck+video+review+adventure+designs+you+tube& view=detail&mid=E827023AE43C3ED >.*

*Primary Examiner* — Craig J Price (74) *Attorney, Agent, or Firm* — Larry Guernsey; Patent Law Office of Larry Guernsey (57) ABSTRACT

An air chuck with variable angle swivel head, having a head, a handle having a front face having a manufactured angle, and a swivel mechanism, which includes a banjo bolt, an air chuck tip and a pin, which together provide an air passage, whereby the head is connected to the handle by the swivel mechanism, and the manufactured angle of the front face of the handle lies in the range of 15 degrees to 45 degrees.

4 Claims, 7 Drawing Sheets

(56) References Cited

U.S. PATENT DOCUMENTS

| | | | | |
|---|---|---|---|---|
| 3,074,457 A * | 1/1963 | Tubbs | B60S 5/043 | 137/227 |
| 3,402,253 A * | 9/1968 | McCracken | F16L 25/01 | 174/86 |
| 4,088,147 A * | 5/1978 | Krechel | F16K 15/20 | 137/223 |
| 4,679,829 A * | 7/1987 | Yanagisawa | F16L 41/005 | 285/190 |
| 5,188,142 A * | 2/1993 | Lind | F16K 15/044 | 137/223 |
| 5,275,444 A * | 1/1994 | Wythoff | F16L 27/0849 | 285/185 |
| 5,379,796 A * | 1/1995 | Wang | B60S 5/04 | 137/231 |
| 5,855,222 A * | 1/1999 | Jou | B05B 1/005 | 137/223 |

* cited by examiner

AIR CHUCK WITH VARIABLE ANGLE SWIVEL HEAD

TECHNICAL FIELD

The present invention relates generally to devices for repairing mechanical parts and more particularly to tools for servicing or replacing the tire in the wheel of a motorcycle.

BACKGROUND ART

Most motorized vehicles use inflatable tires in order to cushion shocks and vibrations encountered in driving. The tire usually has an inflatable airspace or an innertube into which air at higher than atmospheric pressure is pumped by an air chuck, which is generally a fitting attached to a hose of high pressure air through a handle portion. Most of these inflatable tires have a valve stem with a valve to which an air chuck is temporarily attached, in order to direct high pressure air into the airspace or air cavity. In order that air flow is efficiently channeled into the valve stem, the air chuck is fitted with a nozzle that ideally forms an air-tight seal with the valve. In order to form such an air-tight seal, it is important that the nozzle of the air chuck align correctly with the valve within a limited range of angles.

Figure 1:
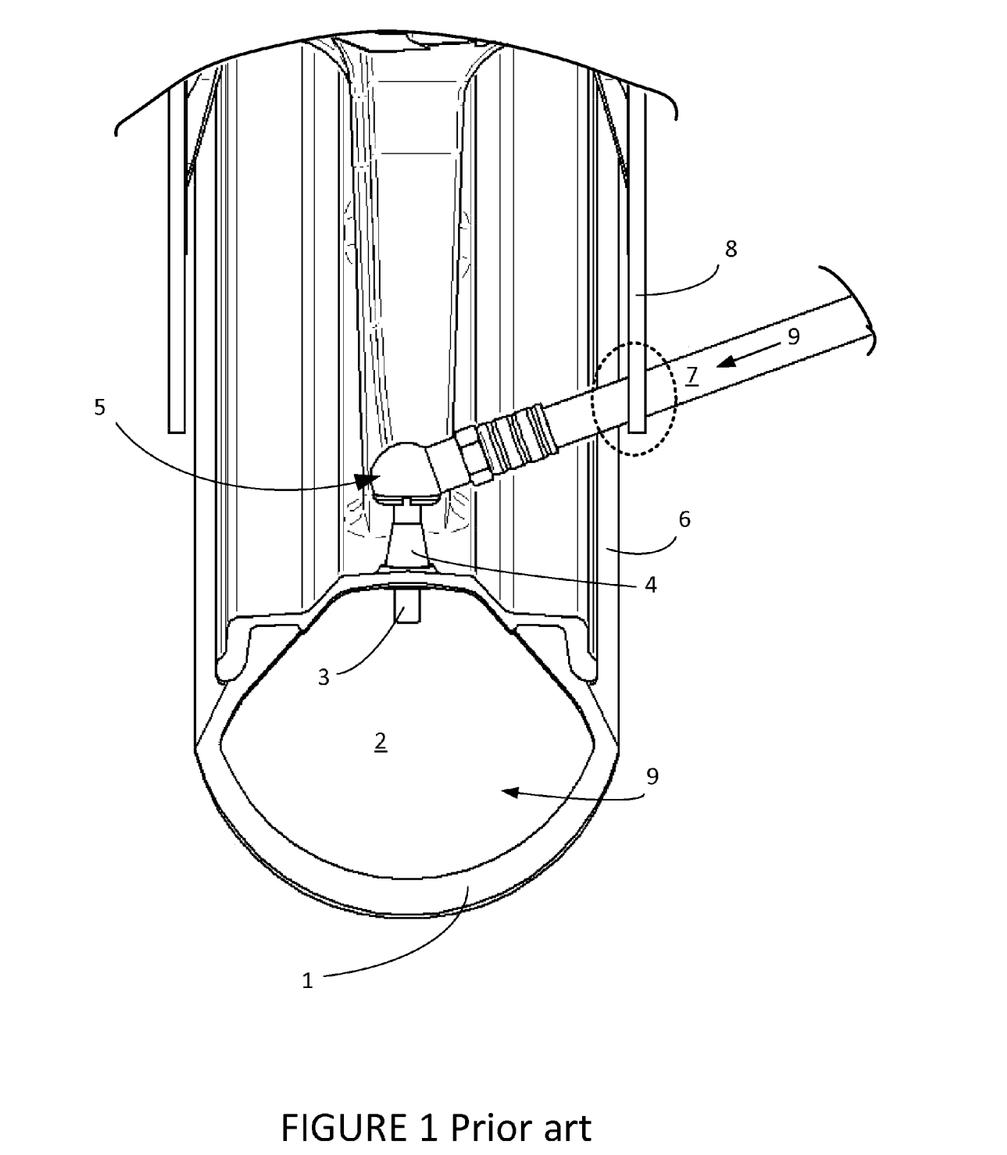
FIG. 1 shows a cut-away view of a vehicle tire and an air chuck of the prior art attempting to engage a valve stem.

In the mid 1980s, most sport motorcycles came with 18 inch or 19 inch front rims along with relatively small brake rotors. At this time, there was a lot of room between the rim and the brake rotor and accessing the air valve was relatively easy. In the mid 1990s, motorcycles were being produced with more and more power and thus needed more traction and better brakes. By the early 2000s, the rim sizes had decreased to 17 and even 16 inches while the diameter of the brake rotors continued to increase. As shown in FIG. 1 (prior art) there is very little room on a modern motorcycle in between the brake rotor and the rim. At present, there is barely enough room to get your hand in between the rim and the rotor, let alone an air chuck.

FIG. 1 (prior art) shows a tire 1 having an air cavity 2, which could be an airspace in the tire, or could be an innertube. A valve 3 having a valve stem 4 allows the introduction of air at high pressure into the air cavity 2. A prior art air chuck 5 has a head which attaches to the valve stem 4, making a temporary attachment to an air hose 7 through which high pressure air 9 is channelled. Also shown are the brake rotors 8, which in earlier models of motor cycles presented no problem to the use of the prior air chucks 5 and the rim 6. However, it can be seen from the figure that the brake rotor 8 interferes with the handle 7 of the prior art air chuck 5, as seen from the circled area. In reality, the air chuck 5 would not be able to cross the lines of the brake rotor, and would be limited to an approach angle which would not allow the handle 7 of the air chuck 5 to intrude into the brake rotor 8. As a result, the head 6 of the prior art air chuck 5 would not be able to attach squarely to the valve stem 4 when air 9 is being pumped into the tire 1.

As anyone who has ever inflated a tire knows, if the head of the air chuck is not seated squarely on the valve stem, the pressurized air stream will not be efficiently directed into the tire, but allows pressurized air to spray out at the connecting juncture, making the process of filing the tire more time consuming and frustrating. In addition, the effort required to get the air chuck and nozzle in alignment may even result in injury to the user's hand, if parts have become heat through use, or there may be other unfortunate consequences.

Thus, there is a need for an air chuck having a swivel head which provides a range of angles for attaching the air chuck to the tire valve.

DISCLOSURE OF INVENTION

Briefly, one preferred embodiment of the present invention is an air chuck with a swivel head.

An advantage of the present invention is that the air chuck with swivel head allows for easier access to a number of tire valves on vehicles with a variety of rim sizes.

Another advantage of the present invention is that it can be easily used on vehicles with smaller rim sizes and larger brake rotors found on vehicles made in the mid-1990s and after.

And another advantage of the present invention is that the air chuck with swivel head can seat more squarely on a tire valve stem because it can be adjusted to a variety of approach angles.

A further advantage of the present invention is that the air chuck with swivel head can fill tires more efficiently since a better air pressure seal can be maintained between the air chuck head and the valve stem.

A yet further advantage of the present invention is that the air chuck with swivel head can reach the valve stem more easily which may reduce injury to hands and to vehicles parts, since a greater variety of approach angles is possible.

Yet another advantage of the present invention is that the air chuck with swivel head includes a fitting which can be loosened to allow rotation and then can be tightened to maintain the desired position.

These and other advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

DETAILED DESCRIPTION OF THE PREFERRED EMBODIMENTS

The present invention is an air chuck with variable angle swivel head, which will be referred to by the reference number 10, and thus shall be referred to as air chuck 10. A preferred embodiment of the air chuck 10 is illustrated in FIGS. 2-8.

Figure 2:
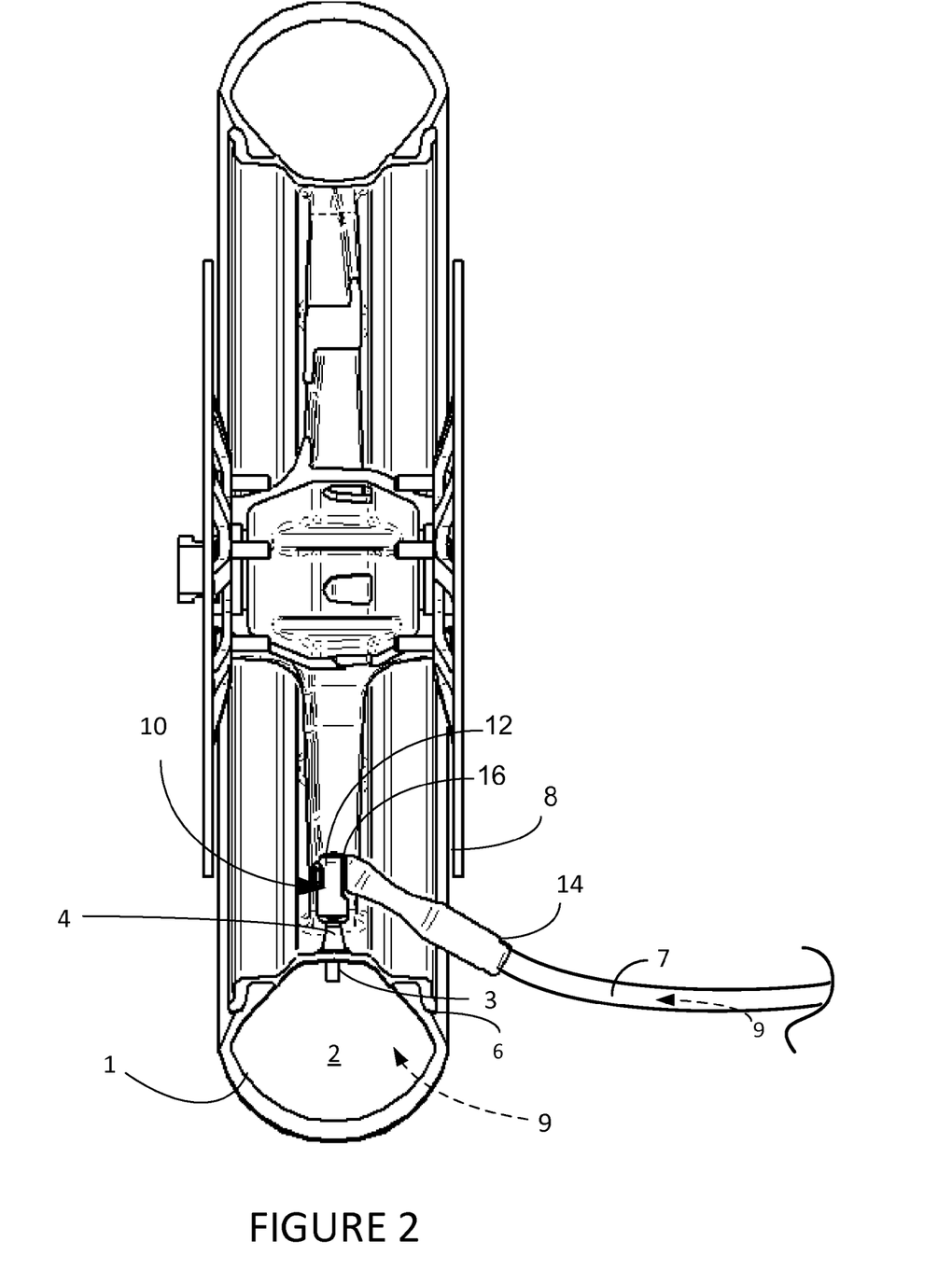
FIG. 2 shows a cut-away view of a vehicle tire and the air chuck with swivel head of the present invention engaging a valve stem.

FIG. 2 shows the present air chuck 10, which generally includes a head 12, and a handle 14. The head 12 is configured with a swivel mechanism 16, which allows the head 12 to be swiveled within a range of angles relative to the handle 14, or to think of it in another way, the handle 14 can be swiveled with respect to the head 12. Since the handle 14 connects to the air hose 7, it may be more natural to think of the head 12 as swiveling, since the range of motion of the handle 14 may be limited by the air hose 7 position. Both interpretations are contemplated by the present invention.

Figure 3:
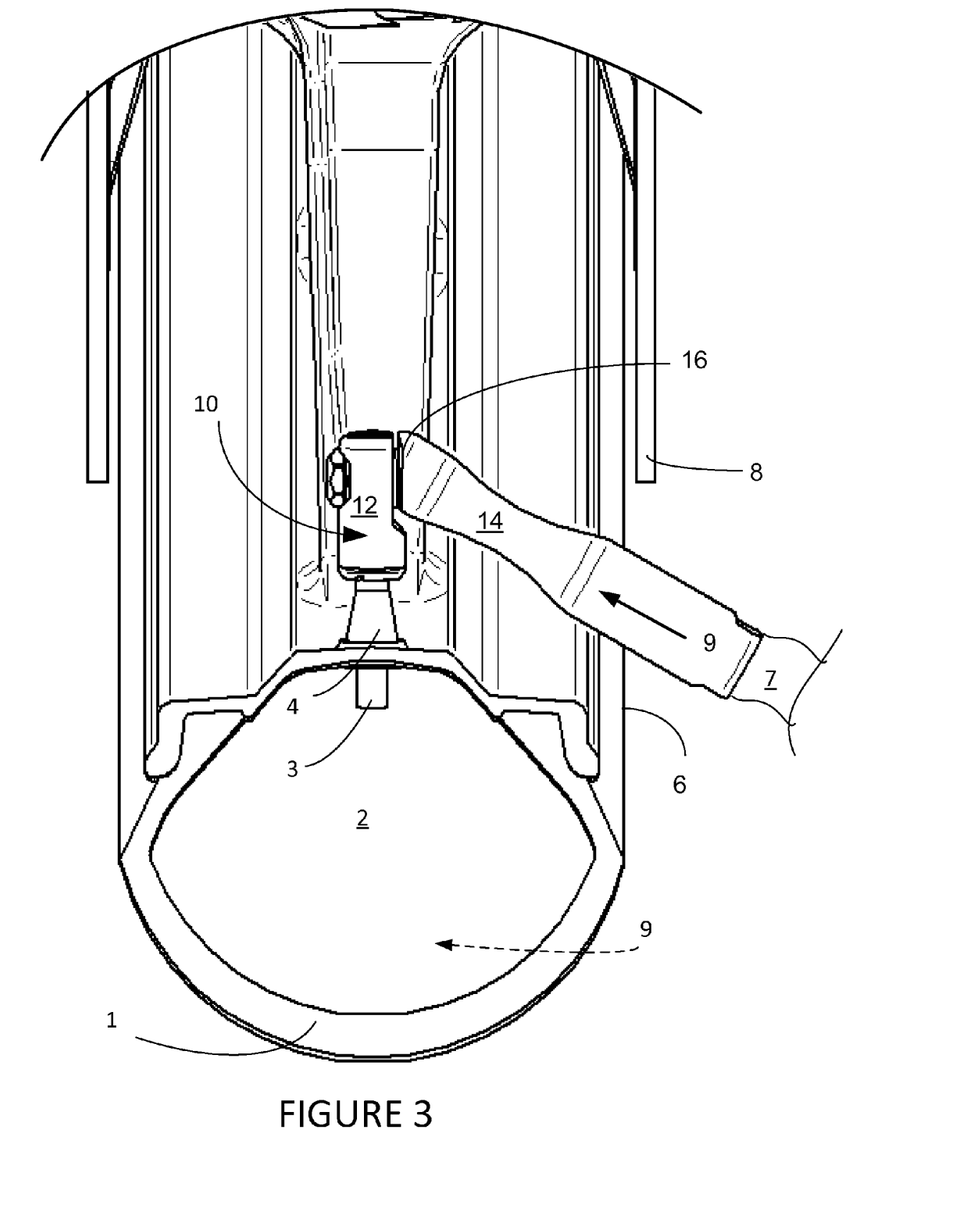
FIG. 3 shows a detail of the cut-away view of a vehicle tire and the air chuck with swivel head of the present invention engaging a valve stem.

In FIGS. 2-3, the air chuck 10 is shown in use with a tire 1 having an air cavity 2, which could be an airspace in the tire, or could be an innertube. A valve 3 having a valve stem 4 allows the introduction of air 9 at high pressure into the air cavity 2. The present head 12 of air chuck 10 attaches to the valve stem 4, making a temporary attachment to an air hose 7 through which high pressure air 9 is channelled. Also shown are the rim 6 and the brake rotors 8, of the type which have been used since the mid-1990s to the present, which are larger, and which present difficulties of attachment to air chucks of the prior art, since these provide only a single rigid attachment angle between the head and the handle.

However, it can be seen from the FIG. 2 that present air chuck 10 with swivel head 12 allows the air chuck 10 to engage the tire valve 4 squarely without interfering with the brake rotor 8.

This is accomplished by swiveling the head 12 with respect to the handle 14, so the handle 14 avoids contact with the rotor 8. Since the head 12 of the air chuck 10 is seated squarely on the valve stem 4, the pressurized air stream is efficiently directed into the tire, and does not allow pressurized air to spray out, making the process of filing the tire less time consuming and frustrating. In addition, since the effort required to get the air chuck 10 and nozzle 4 in alignment is minimized, injury to the user's hand, or other unfortunate consequences is reduced.

Figures 4A, 4B:
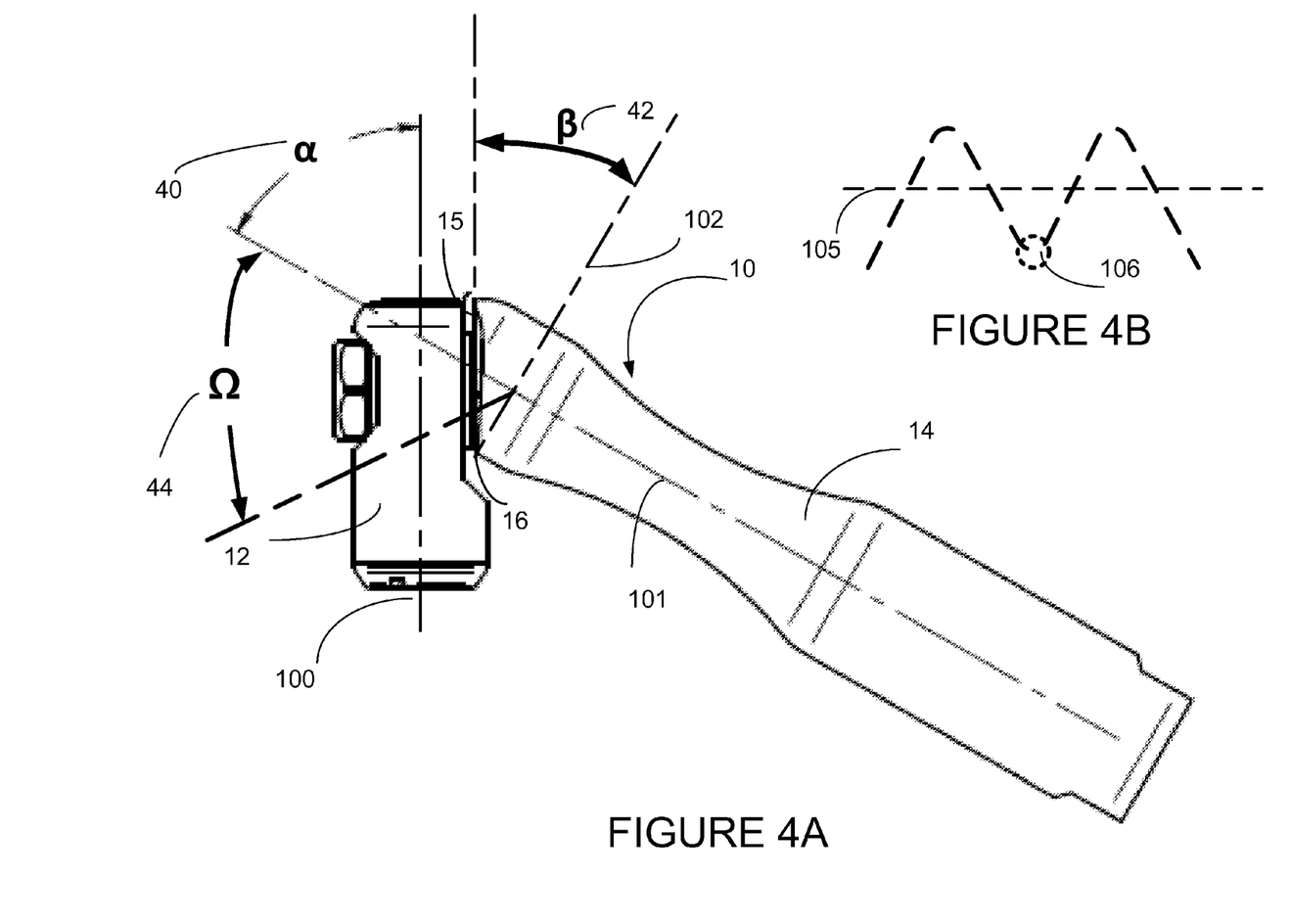
FIG. 4A shows a side view of the air chuck with swivel head of the present invention as the head swivels through its range of motion.
FIG. 4B shows a sine wave describing the position of the handle in the cycle of motion at this time.
Figure 5A:
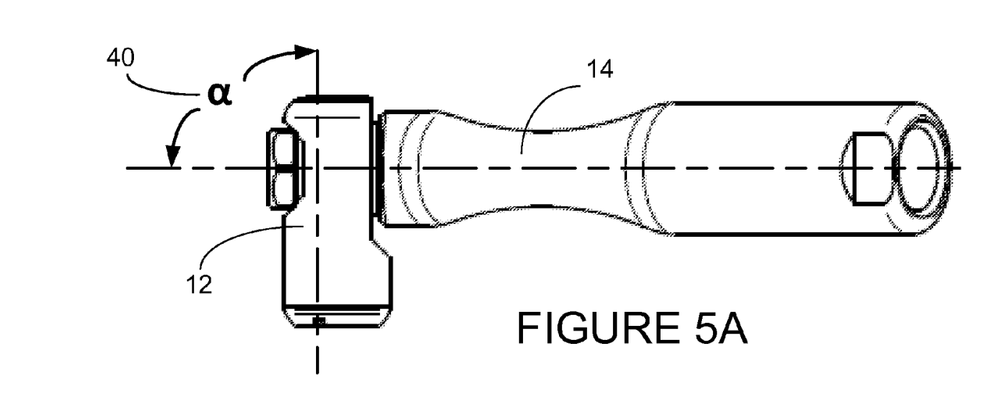
FIG. 5A shows a side view of the air chuck with swivel head of the present invention as the head swivels through its range of motion.
Figure 5B:
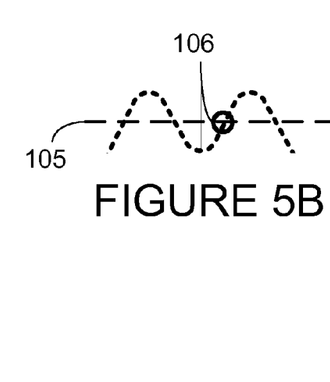
FIG. 5B shows a sine wave describing the position of the handle in the cycle of motion at this time.
Figures 6A, 6B:
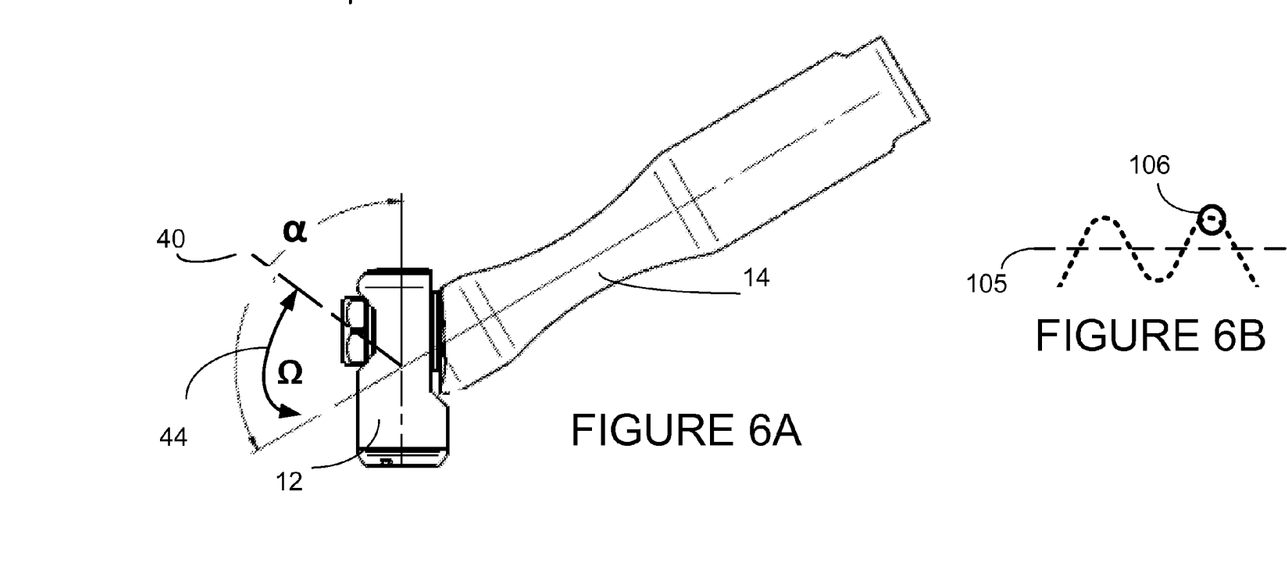
FIG. 6A shows a side view of the air chuck with swivel head of the present invention as the head swivels through its range of motion.
FIG. 6B shows a sine wave describing the position of the handle in the cycle of motion at this time.

As shown in FIGS. 4-6, the preferred angles of movement are depicted by the angle α 40, which for purposes of this discussion will be measured from a vertical upright through the center-line 100 of the head 12 measured counter-clockwise to the projected center-line 101 of the handle 14. Also, for purposes of this discussion, the head 12 is assumed to be held stationary as the handle 14 is moved relative to the head 12, although as discussed above, the head 12 can be thought of as swiveling in relation to the handle 14 in practical use.

This preferred range of angles α 40 preferably extends from 60 degrees with the handle 14 angled downwards with respect to the head 12, shown in FIG. 4A, through angle 90 degrees, as shown in FIG. 5A, to an angle of 120 degrees with the handle 14 angled upwards with respect to the head 12, as shown in FIG. 6A. The range of motion Ω 44, shown in FIGS. 4A and 6A, is thus from 60 degrees to 120 degrees, making a preferred range of angles of 60 degrees, although this is not to be taken as a limitation.

Figure 8:
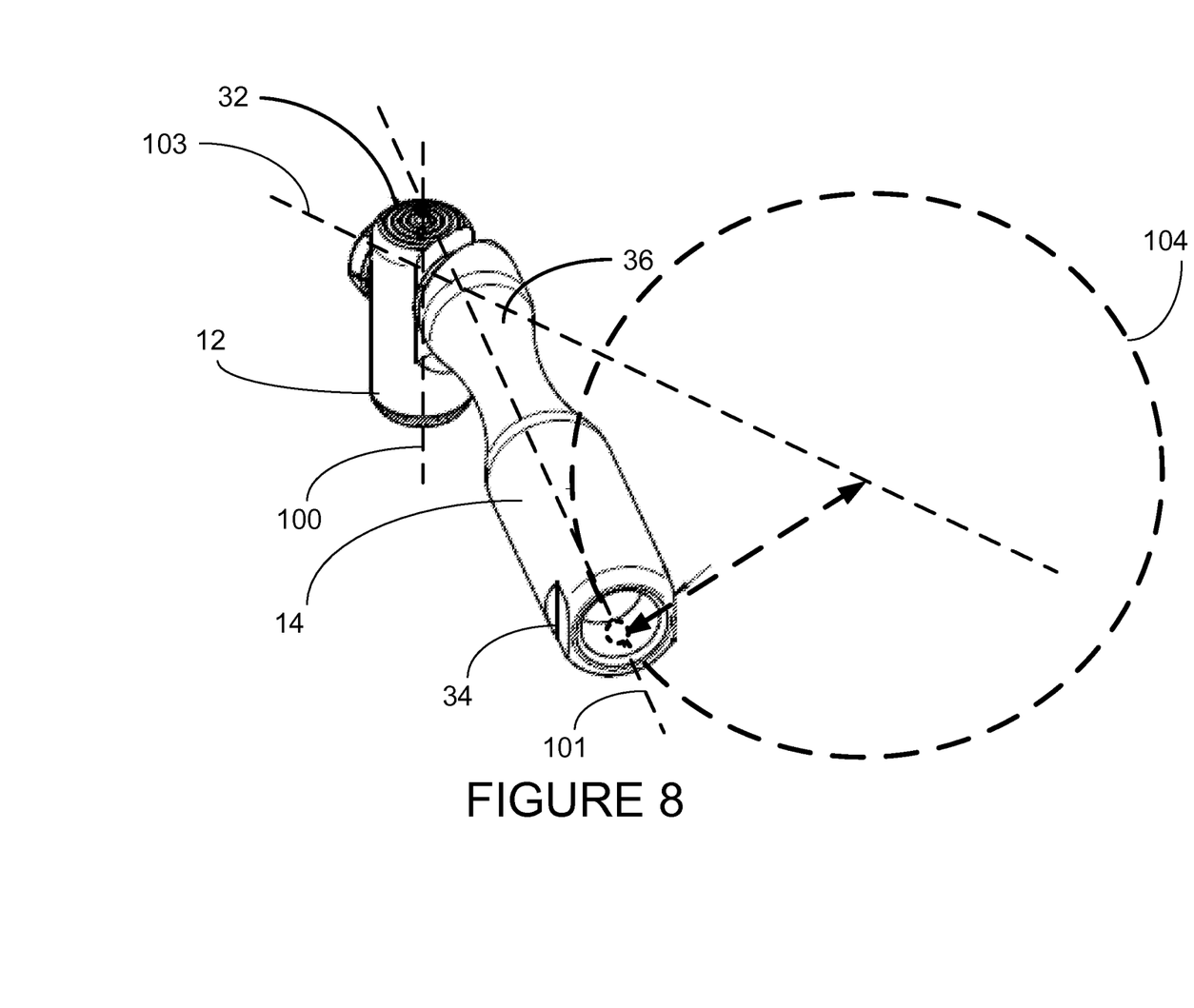
FIG. 8 shows an isometric rear view of the air chuck with swivel head of the present invention.

There are a number of angles of interest in the operation of the air chuck 10. As seen in FIG. 8, when the handle 14 having centerline 101 is swiveled with respect to the head 12 having centerline 100, the end of the handle 14 will describe a circle 104 if seen from a point immediately on the line 103 perpendicular to the center line 100 of the head 12. This circle 104 is shown in FIG. 8, although since the view is isometric, the "circle" will appear to be slightly elliptical.

In FIG. 4A, the air chuck 10 is shown from a side view, which is exactly perpendicular to this circle 104 of movement of FIG. 8, and thus the circular movement of the end of the handle 14 will appear instead to be vertical movement which describes a sine wave on a graph of vertical displacement vs. rotation from this viewpoint, as the handle 14 swivels through the full cycle of circular movement. In FIG. 4A, it will be assumed that the end of the handle is in its furthest downward position, thus at the lowest position 106 on a graph of displacement versus rotation on the sine-wave form 105 of FIG. 4B at this point in the swivel cycle.

In FIG. 5A, as seen from the side, the handle endpoint will be at the neutral point or crossing the axis of the sine-wave 105 of FIG. 5B. In FIGS. 6A and B, it has reached the highest point 106 in the sine-wave cycle as seen from the side view.

For purposes of discussion, this position of the end of the handle being at the lowest point of the sine-wave will be referred to as the default angle, so FIG. 4A shows the handle 14 when in the default angle in the rotation cycle. At this point in the cycle, there is shown an angle referred to as β 42, which will be measured from the front face 15 of the handle 14, parallel to the center line 100 of the head 12, to a line 102 perpendicular to the center line 101 of the handle 14. This angle β 42 is established when the air chuck 10 is designed and later manufactured, and thus will be referred to as manufactured angle β 42. It will be seen that this manufactured angle β 42 is complementary to angle α 40, so that angle α 40+angle β 42=90 degrees.

Thus, In FIG. 4A where angle α 40=60 degrees, this manufactured angle β42=30 degrees, which is illustrated for this manufactured angle in FIGS. 4A-6A, but it is not limited to this value.

Another angle of interest will be referred to as the angular range of motion Ω 44, which is the range of angles that angle α 40 will travel through during a circular cycle for a given manufactured angle β 42. It is presently preferred that manufactured angle β 42 be in the range of 15-45 degrees, which means that complementary angle α 40 will be in the range of 75-45 degrees, respectively, which results in eccentric motion of the rear end portion of the handle with respect to the head. For angle α 40 with a manufactured angle β 42 of 15 degrees at the low end of the range of 15-45 degrees, angular range of motion Ω 44 is thus from 75 degrees to 105 degrees as measured from the center line 100 of the head 12. For angle α 40 with a manufactured angle β 42 of 45 degrees, at the high end of the range, angular range of motion Ω 44 is thus from 45 degrees to 135 degrees as measured from the center line 100 of the head 12.

In the present discussion, it will be assumed that the manufactured angle β is 30 degrees, and thus angle α 40=60 degrees, as shown in FIGS. 2-8, although it can be any of the angles in the preferred range, as just discussed, and is not to be taken as a limitation.

FIGS. 2-3 show the air chuck with swivel head 10 engaged with filling a tire 1 with air 9. The head 12 is swiveled into an angle which is in the preferred range of 60 degrees, although, again, this is not to be taken as a limitation. At this angle, the handle 14 and the air hose 7 easily avoid contact with the brake rotor 8, and thus hands of the user are in less danger of contacting the brake rotors 8, which may be hot. The angle at which the air chuck head 12 approaches the valve stem 4 of the tire 1, is much more straight-on, and the air chuck head 12 can be expected to make a much better air seal with the valve 3. Filling the tire with high pressure air will be more efficient with less leakage, and the process will be much faster and less frustrating.

Figure 7:
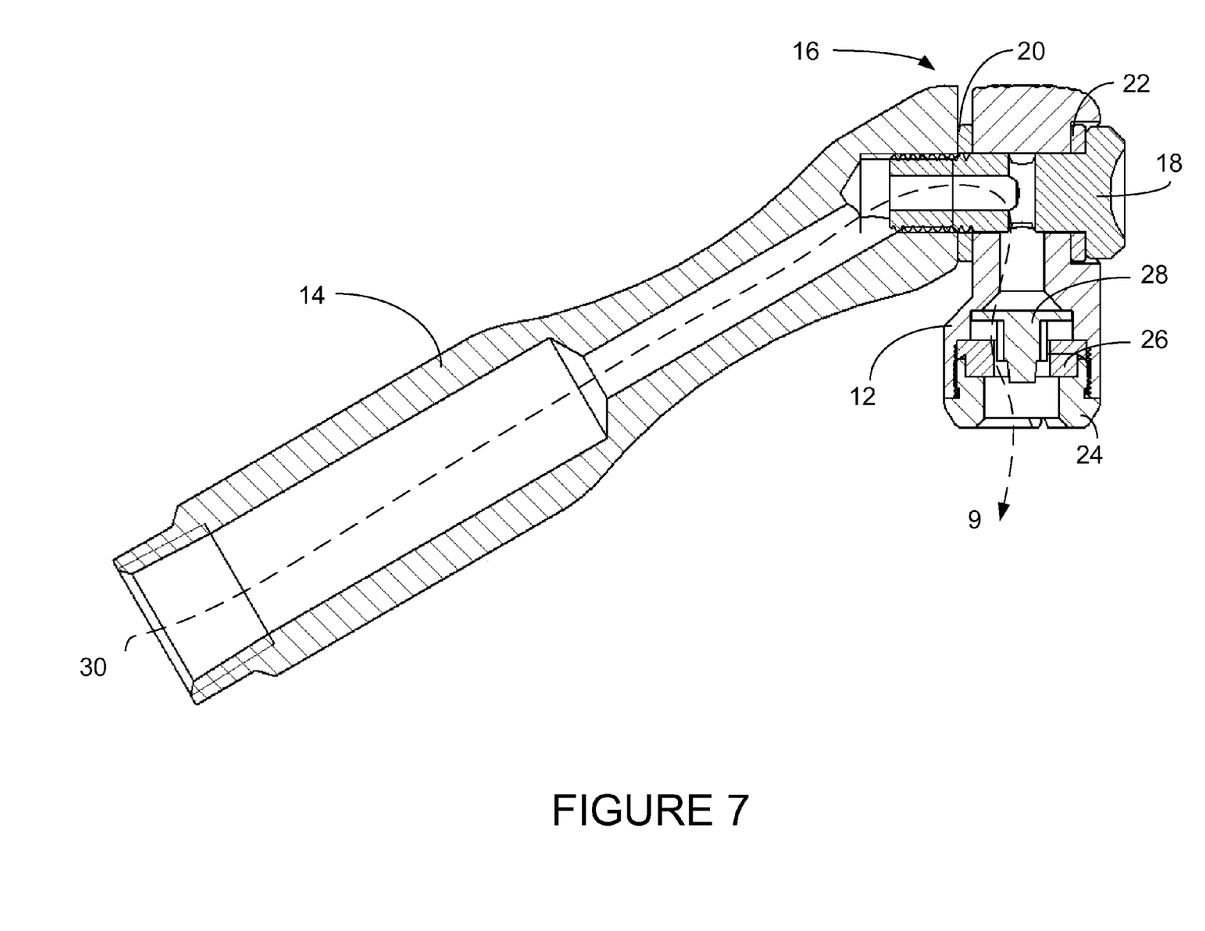
FIG. 7 shows a side cut-away view of the air chuck with swivel head of the present invention.

FIG. 7 shows a cross-sectional view of the air chuck with swivel head 10, showing the inner components which enable the swivel mechanism 16, which comprises a banjo bolt 18, tip 24 and pin 28, which together provide an air passage. The head 12 is connected to the handle 14 by a banjo bolt 18 which compresses a head gasket 20 between the head 12 and the handle 14, to prevent air leakage. A second head gasket 22 is also compressed by the banjo bolt 18. The air chuck tip 24 screws into the body of the head 12, compressing a tip gasket 26, and holding the pin 28 in place. The banjo bolt 18 can be loosened to allow rotation and then can be tightened to maintain the desired position. This is a decided advantage as it allows the head 12 to be maintained at the desired angle when in use, rather than swiveling out of position when used at an awkward angle. This may also prevent injury to the user's hands which may otherwise come into contact with heated parts if the swivel is allowed to swivel freely or slip off the valve stem.

In practice, the tip of the valve stem 4 fits into the air chuck tip 24 until it contacts the pin 28, which is normally forced outwards by high air pressure supplied by the hose 7. As the pin 28 is forced inwards against the high pressure air, an air passage 30 opens up allowing high pressure air 9 to pass from the hose 7 (see also FIG. 2), through the hollow handle 14, through cavities in the banjo bolt 18 and head 12, through the pin 28 and tip 24, into the valve 3 and finally into the cavity 2 in the tire 1.

FIG. 8 illustrates the air chuck 10 from a rear isometric view, which shows a textured area 32 for added grip, integrated flats 34 for easy assembly to the air hose, and a profiled handle portion 36 which provides added clearance between the rim and the brake rotor. These features are presently preferred, but should not be considered as limitations on the air chuck 10.

While various embodiments have been described above, it should be understood that they have been presented by way of example only, and not limitation.

INDUSTRIAL APPLICABILITY

The present air chuck with swivel head 10 is well suited generally for use in servicing or replacing the tire in the wheel of a motorcycle or other vehicle which uses inflatable tires.

The operation of the air chuck 10 is shown in FIGS. 2-3 with a wheel 1 and a tire 2 having a bead 3. FIG. 2 shows the present air chuck 10, which generally includes a head 12, and a handle 14. The head 12 is configured with a swivel mechanism 16, which allows the head to be swiveled within a range of angles, relative to the handle 14.

In FIGS. 2-3, the air chuck 10 is shown in use with a tire 1 having an air cavity 2, which could be an airspace in the tire, or could be an innertube. A valve 3 having a valve stem 4 allows the introduction of air at high pressure into the air cavity 2. The present head 12 of air chuck 10 attaches to the valve stem 4, making a temporary attachment to an air hose 7 through which high pressure air 9 is channelled. It can be seen from the FIG. 2 that present air chuck 10 with swivel head 12 allows the air chuck 10 to engage the tire valve 4 squarely without interfering with the brake rotor 8.

This is accomplished by swiveling the head 12 with respect to the handle 14, so the handle 14 avoids contact with the rotor 8. Since the head 12 of the air chuck 10 is seated squarely on the valve stem 4, the pressurized air stream is efficiently directed into the tire, and does not allow pressurized air to spray out, making the process of filing the tire less time consuming and frustrating. In addition, since the effort required to get the air chuck 10 and nozzle 4 in alignment is minimized, injury to the user's hand, or other unfortunate consequences is reduced.

As shown in FIGS. 3-5, the preferred range of angles of movement is depicted by the angle α 40, which preferably extends from 60 degrees with the handle 14 angled downwards with respect to the head 12, shown in FIG. 3, through angle 90 degrees, as shown in FIG. 4, to an angle of 120 degrees with the handle 14 angled upwards with respect to the head 12. The preferred range of motion is thus from 60 degrees to 120 degrees, although this is not to be taken as a limitation.

For the above, and other, reasons, it is expected that the air chuck with swivel head 10 of the present invention will have widespread industrial applicability. Therefore, it is expected that the commercial utility of the present invention will be extensive and long lasting.

What is claimed is:

1. An air chuck with variable angle swivel head, comprising:
   a head;
   a handle having a front face having a manufactured angle and said handle also having a rear end portion; and
   a swivel mechanism which comprises a banjo bolt, an air chuck tip and a pin, which together provide an air passage, whereby said head is connected to said front face of said handle by said swivel mechanism, such that rotation of said handle with respect to said head results in eccentric motion of said rear end portion of said handle with respect to said head and said manufactured angle of said front face of said handle lies in a range of 15 degrees to 45 degrees.

2. The air chuck with swivel head of claim 1 wherein said swivel mechanism has a range of motion of between 60 degrees and 120 degrees between said head and said handle.

3. The air chuck with swivel head of claim 1 wherein said swivel mechanism has a range of motion of between 75 degrees and 105 degrees between said head and said handle.

4. The air chuck with swivel head of claim 1 wherein said swivel mechanism has a range of motion of between 45 degrees and 135 degrees between said head and said handle.

* * * * *